United States Patent [19]

Noguchi et al.

[11] 4,036,180
[45] July 19, 1977

[54] FUEL REFORMING SYSTEM FOR AN INTERNAL COMBUSTION ENGINE

[75] Inventors: Masaaki Noguchi, Nagoya; Tsuchio Bunda, Okazaki; Taro Tanaka, Chiryu, all of Japan

[73] Assignee: Nippon Soken, Inc., Nishio, Japan

[21] Appl. No.: 663,470

[22] Filed: Mar. 3, 1976

[30] Foreign Application Priority Data

Mar. 5, 1975 Japan .................................. 50-27490

[51] Int. Cl.² .................. F02B 43/08; F02M 31/00
[52] U.S. Cl. .................................. 123/3; 123/122 G; 48/107
[58] Field of Search ............... 48/107, 212; 23/288 R, 23/288 F; 123/1 A, 3, 119 E, 122 G, DIG. 12

[56] References Cited

U.S. PATENT DOCUMENTS

| 1,262,846 | 4/1918 | Rider | 123/122 G |
|---|---|---|---|
| 2,079,632 | 5/1937 | Rector | 123/122 G |
| 2,247,181 | 6/1941 | Berhoudar | 48/107 |
| 2,398,654 | 4/1946 | Lubbock | 48/107 |
| 2,520,925 | 9/1950 | Garbo | 48/212 |
| 2,801,159 | 7/1957 | Carton | 23/288 R |
| 2,904,417 | 9/1959 | Te Nuyl | 48/212 |
| 3,765,382 | 10/1973 | Vandenburg | 123/122 G |
| 3,871,838 | 3/1975 | Henkel | 48/107 |
| 3,897,225 | 7/1975 | Henkel | 123/119 E |

FOREIGN PATENT DOCUMENTS

778,207   7/1957   United Kingdom .................. 48/212

*Primary Examiner*—Wendell E. Burns
*Assistant Examiner*—William Randolph
*Attorney, Agent, or Firm*—Cushman, Darby & Cushman

[57] ABSTRACT

A system for converting a rich air-fuel mixture to a reformed gaseous mixture containing hydrogen and for feeding the reformed gaseous mixture to an internal combustion engine comprises a carburetor for producing the rich air-fuel mixture, a vortex combustion type burner for imperfectly burning the mixture to produce heat and partially oxidized gaseous mixture, and a reactor vessel provided therein with a catalyst bed of annular cross-section. The partially oxidized gaseous mixture flows radially inwardly through the catalyst bed into a central passage defined by the annular catalyst bed so that the partially oxidized gaseous mixture is completely converted into the reformed gaseous mixture during the passage through the catalyst bed.

11 Claims, 4 Drawing Figures

FUEL REFORMING SYSTEM FOR AN INTERNAL COMBUSTION ENGINE

BACKGROUND OF THE INVENTION

1. FIELD OF THE INVENTION

The present invention relates generally to an internal combustion engine operable with a mixture of air and a fuel such as hydrocarbon fuel (for example, gasoline) or alcohols (for example, methyl alcohol) and, more particularly, to a fuel reforming system for converting a rich mixture of air and the fuel into an easily combustible reformed gaseous mixture containing hydrogen and for feeding the reformed gaseous mixture into a combustion chamber or chambers of the engine for the improved combustion therein to thereby reduce the emission of the harmful components of the engine exhaust gases.

2. Description of the Prior Art

In order to reduce the harmful components of engine exhaust gases, there has been proposed an intake system for an internal combustion engine. The proposed intake system was provided with a fuel reforming system in which a hydrocarbon fuel such as gasoline was merely added with water, air and the engine exhaust gas to form a mixture which was then introduced into a reactor provided with a catalyst for the catalytic reaction between the components of the mixture at a temperature of from about 250 to about 1,000° C so that a part of the fuel was reformed into hydrogen, carbon monoxide and/or methane to be fed into the engine. There has also been proposed another type of intake system designed to supply an associated engine with a mixture of hydrogen gas from a hydrogen container and a hydrocarbon fuel from a fuel tank.

The proposed fuel reforming system of the first-mentioned type of intake system required a water container, which caused a problem that the water in the container was frozen with a burst of the container in winter season or a cold district. In the case where the fuel used contained a compound of lead, the engine exhaust gas recirculated into the reactor contained the lead compound by which the catalyst was damaged. Even in the case where the fuel did not contain the lead compound, soot and/or tar was included in the engine exhaust gas and deposited on the surface of the catalyst carrier to reduce the efficiency of the catalyst. The reformed gaseous mixture, moreover, included gaseous components which were unnecessary for the engine operation and which reduced the efficiency of charge of the reformed gaseous mixture into the combustion chambers of the engine and adversely affected the engine performance.

The second-mentioned type of intake system required a hydrogen container which was accompanied by a danger of explosion, inevitably bulky in size and heavy. Thus, this type of intake system was not suitable for an internal combustion engine for an automobile.

SUMMARY OF THE INVENTION

In order to eliminate or minimize the disadvantages of the prior art intake systems for internal combustion engine, the present invention aims to provide an improved fuel reforming system for an internal combustion engine which is operative to convert safely, economically and without adversely affecting the engine performance, a rich mixture of air and a fuel into a reformed gaseous mixture rich with hydrogen and which can be compact and installed in a narrow engine compartment of an automobile.

The fuel reforming system according to the present invention includes means for producing a rich mixture of air and a fuel such as gasoline. The rich mixture producing means may preferably be a conventional carburetor, but a fuel injection device can alternatively be employed. A burner is provided to imperfectly burn the thus produced rich air-fuel mixture for causing partial oxidizaton of the fuel contained in the rich air-fuel mixture thereby to produce a partially oxidized gaseous mixture. In order to stably and continuously obtain the imperfect burning of the rich air-fuel mixture of a small air-fuel ratio, the burner used in the present invention is of vortex combustion type and has a preswirling chamber connected to the rich mixture producing means so that the rich air-fuel mixture is introduced into the preswirling chamber to form a vortex of the rich air-fuel mixture therein, an ignition chamber disposed in communication with the pre-swirling chamber and provided with an igniting means for igniting the rich air-fuel mixture received from the pre-swirling chamber, and an imperfect combustion chamber disposed in communication with the ignition chamber for receiving the thus ignited rich air-fuel mixture from the ignition chamber to cause the partial oxidization of the fuel and produce the partially oxidized gaseous mixture.

A reactor vessel is connected to the burner and provided with an inlet through which the interior of the vessel is communicated with the imperfect combustion chamber of the burner. The reactor vessel is also provided with an outlet leading to the combustion chamber of an associated engine.

Generally tubular means defining therein a central passage and a generally tubular chamber surrounding the central passage and being in fluid flow communication therewith are disposed in the reactor vessel so that the tubular means and the reactor vessel cooperate to define the therebetween a second passage surrounding the tubular chamber and being in fluid flow communication with the imperfect combustion chamber and with the tubular chamber and so that the central passage is connected to the outlet of the reactor vessel, whereby the partially oxidized gaseous mixture can flow from the imperfect combustion chamber through the second passage into the tubular chamber. The tubular means may preferably be in the form of a pair of substantially cylindrical and perforated walls formed of punched sheet metals or wire screens.

A catalyst means is disposed in the tubular chamber for facilitating catalytic conversion of the partially oxidized gaseous mixture to a reformed gaseous mixture containing hydrogen. The reformed gaseous mixture thus produced flows out of the tubular chamber into the central passage and then through the outlet of the reactor vessel toward the combustion chamber of the engine. The catalyst may be in the form of granular catalyst carriers or particles which form a catalyst bed received in the tubular chamber.

The provision of the second passage between the generally tubular means and the reactor vessel and in fluid flow communication with the imperfect combustion chamber and with the tubular chamber in which the catalyst means is disposed assures that the imperfect burning of the rich air-fuel mixture initiated in the ignition chamber of the burner stably continues by the time the ignited rich air-fuel mixture has moved through the second passage, so that the partial oxidization of the rich air-fuel mixture is facilitated. Then, the partially oxidized rich air-fuel mixture flows into contact with the catalyst means and is converted into the reformed gaseous mixture by catalytic reforming reaction produced between components of the partially oxidized rich air-fuel mixture. The reformed gaseous mixture thus produced contains a large percentage of hydrogen and is easily ignitable and combustible in the engine combustion chamber at a very large air-fuel ratio at which an ordinary mixture of air and a merely atomized hydrocarbon fuel is hardly ignitable and combustible. This greatly contributes to the reduction in the emission of harmful exhaust components; hydrocarbon (HC), carbon monoxide (CO) and nitrogen oxides ($NO_x$), and particularly the reduction in the emission of nitrogen oxides.

In addition, the particular arrangement of the burner and the reactor vessel and, particularly, the arrangement of the reactor vessel and the catalyst means, as discussed above, ensures that the entire system can be made very compact and thus installed in a very small or narrow engine compartment of an associated automobile.

The above and other objects, features and advantages of the present invention will be made more apparent by the following description with reference to the accompanying drawings.

DESCRIPTION OF PREFERRED EMBODIMENTS

Figure 1:
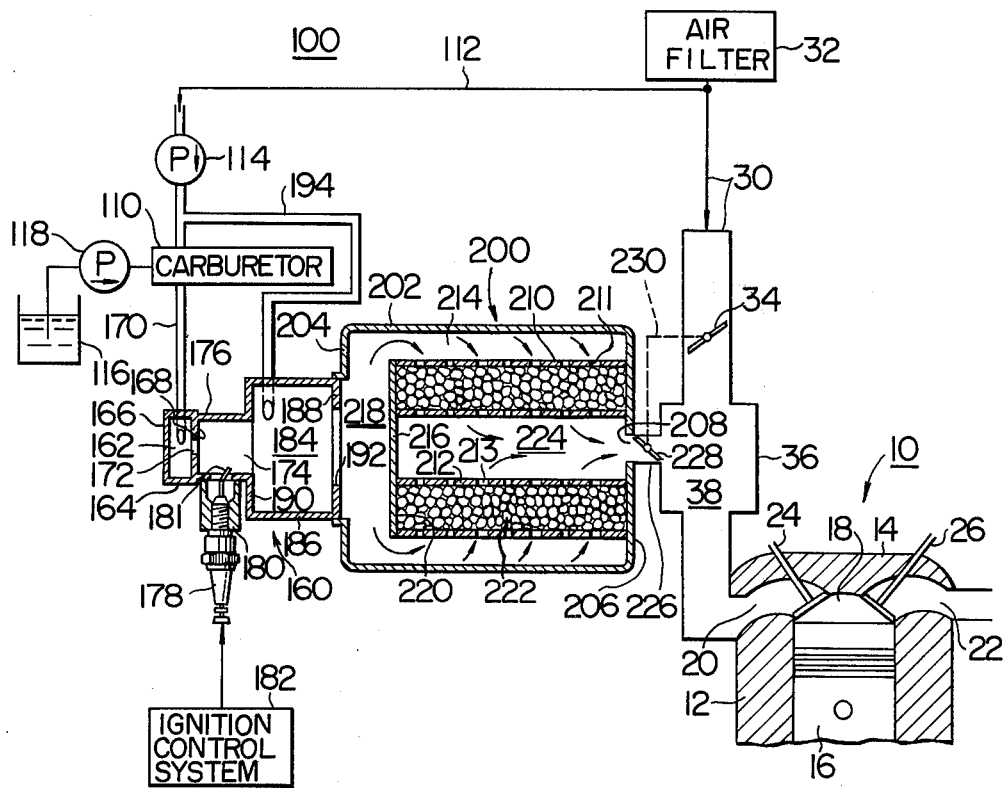
FIG. 1 is a partly diagrammatic, sectional side view of an embodiment of the fuel reforming system according to the present invention and an associated internal combustion engine.

Referring to FIG. 1, a preferred embodiment of the fuel reforming system according to the present invention is generally indicated by 100 and designed to be used with an internal combustion engine generally indicated by 10. The engine 10 is shown as being of the type that comprises a cylinder 12, cylinder head 14 mounted on the top of the cylinder 12, a piston 16 reciprocally mounted in the cylinder 12 and cooperating with the cylinder 12 and the cylinder head 14 to define a combustion chamber 18, intake and exhaust ports 20 and 22 formed in the cylinder head 14, and intake and exhaust valves 24 and 26 movably mounted on the cylinder head 14 to control the communication of the intake and exhaust ports 20 and 22 with the combustion chamber 18. An intake pipe 30 extends between an air filter 32 and the intake port 20. A throttle valve 34 is pivotally mounted in the intake pipe 30 and operatively connected to an acceleration pedal (not shown) of an associated automobile by any conventional mechanical connecting means such as a link mechanism (not shown).

The intake pipe 30 has an expanded or bulged portion 36 disposed downstream of the throttle valve 34 and defining therein a mixing chamber 38 for the purpose to be made apparent later.

The fuel reforming system 100 shown in FIG. 1 comprises means 110 for producing a rich mixture of air and a hydrocarbon fuel, such as gasoline, and a fuel reforming device for converting the rich air-fuel mixture into a reformed gaseous mixture containing hydrogen and feeding the thus converted, reformed gaseous mixture into the internal combustion engine 10 for the ignition and combustion therein.

In the illustrated embodiment of the invention, the rich air-fuel mixture producing means 110 is a carburetor connected by an air pipe 112 to the intake pipe 30 between the air filter 32 and the throttle valve 34. An air pump 114 is provided in the air pipe 112 to pump air from the intake pipe 30 to the carburetor 110. The fuel is supplied in liquid state from a fuel tank 116 to the carburetor 110 by a fuel pump 118.

The fuel reforming device includes a burner 160 of vortex combustion type and a generally cylindrical reactor vessel 200 connected to the burner. The burner 160 is for igniting the rich air-fuel mixture produced by the carburetor 110 to cause "partial or imperfect oxidization" of the mixture.

The words partial or imperfect oxidization are used herein to mean such a reaction that carbon (C), for example, is oxidized not to such an extent as to produce carbon dioxide ($CO_2$) but to such an extent as to produce carbon monoxide (CO). The burner 160 includes a pre-swirling chamber 162 defined by a generally cylindrical peripheral wall 164 and end walls 166 and 168. The carburetor 110 is connected to the pre-swirling chamber 162 by a rich mixture supply pipe 170 extending tangentially to the periphery of the pre-swirling chamber 162 so that the rich air-fuel mixture supplied from the carburetor 110 into the pre-swirling chamber 162 is formed into a vortex of the rich air-fuel mixture therein. One of the end walls 168 of the pre-swirling chamber 162 is formed therein with a discharge aperture 172 through which the chamber 162 is communicated with an ignition chamber 174 defined by the end wall 168 of the pre-swirling chamber 162 and a generally cylindrical peripheral wall 176 connected to the end wall 168. The ignition chamber 174 is of a diameter slightly smaller than that of the pre-swirling chamber 162 and provided with a sparking plug 178 mounted on the peripheral wall 176 by means of a holder 180 to ignite the rich air-fuel mixture flowing from the pre-swirling chamber 162 through the aperture 172 into the ignition chamber 174. Preferably, the sparking plug 180 is of a design that has a single or center electrode 181 which is somewhat longer than the center electrode of an ordinary type sparking plug and which is bent at the free end portion to form a spark gap between the end extremity of the electrode 181 and a part of the peripheral wall 176. The sparking plug 178 is electrically connected to an ignition control system 182 which may be of a conventional construction and arrangement.

The end of the ignition chamber 174 remote from the pre-swirling chamber 162 is open to a generally cylindrical, partial or imperfect combustion chamber 184 of a diameter larger than that of the pre-swirling chamber 162. The imperfect combustion chamber 184 is defined by a generally cylindrical peripheral wall 186 and annular end walls 188 and 190. The annular end wall 188 defines therein a generally circular opening 192 of a diameter larger than that of the ignition chamber 174, while the other annular end wall 190 is connected along its inner peripheral edge to the end of the ignition chamber peripheral wall 176 remote from the pre-swirling chamber 162. A secondary air pipe 194 is connected at one end to the air pipe 112 between the air pump 114 and the carburetor 110. The other end of the secondary air pipe 194 is connected to the peripheral wall 186 of the imperfect combustion chamber 184 so that the downstream end of the secondary air pipe 194 is tangentially open to the imperfect combustion chamber 184 to cause the secondary air to swirl therein.

The imperfect combustion chamber 184 is communicated through the opening 192 with the interior of the reactor vessel 200 having an inner diameter larger than that of the imperfect combustion chamber 184. The reactor vessel 200 has a substantially cylindrical peripheral wall 202, a first annular end wall 204 connected to the peripheral wall 186 of the imperfect combustion chamber 184 and a second annular end wall 206 defining therein an outlet opening 208. A pair of substantially cylindrical and radially spaced walls 210 and 212 formed therein with a plurality of apertures 211 and 213, respectively, are disposed within the reactor vessel 200 so that the cylindrical walls 210 and 212 are substantially coaxial with the axis of the reactor vessel 200 and so that the outer cylindrical wall 210 is radially inwardly spaced from the peripheral wall 202 of the reactor vessel 200 to define therewith an annular passage 214. The cylindrical walls 210 and 212 are preferably formed by punched sheet metals or wire screens and have downstream ends connected to the downstream end plate 206 of the reactor vessel 200. The upstream ends of the cylindrical walls 210 and 212 are spaced from the upstream end plate 204 of the reactor vessel 200. A disc-like closure plate 216 is secured to the upstream ends of the cylindrical walls 210 and 212, so that the closure plate 216 cooperates with the annular end wall 188 of the imperfect combustion chamber 184 and with the annular upstream end wall 204 of the reactor vessel 200 to define a circumferentially continuous space or passage 218 which is communicated with the annular passage 214, while a part of the closure plate 216, the pair of cylindrical walls 210 and 212 and a part of the downstream end wall 206 of the reactor vessel 200 define an annular chamber 220 which is filled with catalyst particles forming a catalyst bed 222. Thus, the annular chamber 220 is called hereunder "catalyst chamber". The central part of the closure plate 216 and the inner cylindrical wall 212 define a central passage 224 which is closed at its upstream end by the closure plate 216. The annular passage 214, the catalyst chamber 220 and the central passage 224 are communicated with each other by the apertures 211 and 213 in the cylindrical walls 210 and 212. A delivery pipe 226 interconnects the reactor vessel 200 and the bulged portion 36 of the intake pipe 30 of the engine 10 so that the central passage 224 in the reactor vessel 200 is communicated with the mixing chamber 38 in the intake pipe 30 through the outlet opening 208 in the reactor vessel end wall 206 and through the delivery pipe 226. A conventional flap valve 228 is pivotally mounted in the delivery pipe 226 and operatively connected by a conventional mechanical connecting means 230 to the throttle valve 34 in the intake pipe 30 for the purpose to be made apparent later.

The catalyst bed 222 formed by the catalyst particles may alternatively be in the form of an integral catalyst carrier (not shown) having a tubular and hollow shape defining therein an axial central passage like the passage 224 in the embodiment shown and a plurality of small radial passages. The alternative catalyst carrier may comprise a honeycomb structure of a ceramic material.

Examples of the catalyst carried by the catalyst particles forming the catalyst bed 222 or by the alternative integral catalyst carrier are nickel, copper, chromium, cobalt, platinum, rhodium and a combination of some of these materials. These catalyst materials, when contacted by a mixture of air and a hydrocarbon fuel, facilitate thermal decomposition of the fuel and stream reforming of the air-fuel mixture.

Figure 2:
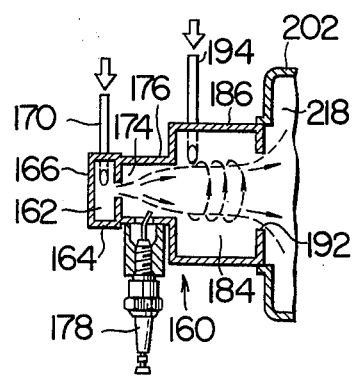
FIG. 2 is a fragmentary sectional side view of the fuel reforming system diagrammatically showing the flows of rich air-fuel mixture and a secondary air in a vortex combustion type burner and a reactor vessel shown in FIG. 1.

In operation, the carburetor 110 produces a rich mixture of air and a hydrocarbon fuel. In the case where gasoline is used, the rich air-fuel mixture should be of an air-fuel ratio ranging from 3 to 9. The rich air-fuel mixture is supplied through the rich mixture supply pipe 170 tangentially into the pre-swirling chamber 162 so that the rich air-fuel mixture swirls in the pre-swirling chamber 162 to form a vortex, whereby the fuel contained in the swirling air-fuel mixture is effectively atomized. The air-fuel mixture then flows through the discharge aperture 172 into the ignition chamber 174 and is ignited by the sparking plug 178. The ignited air-fuel mixture then flows into the imperfect combustion chamber 184 in which an imperfect combustion or partial oxidization of the mixture is initiated while the mixture is diluted by secondary air introduced through the secondary air pipe 194 tangentially into the imperfect combustion chamber 184 in such a manner that the air swirls in the chamber 184, as diagrammatically illustrated in FIG. 2. It is to be noted that, although the air-fuel mixture produced by the carburetor 110 is very rich and not easily combustible, the tangential introduction of the secondary air facilitate stable and continuous imperfect combustion of the mixture so that an imperfectly burnt gas-mixture is produced. The air-fuel ratio of the total of the rich air-fuel mixture produced by the carburetor 110 and the secondary air fed into the imperfect combustion chamber 184 ranges from 5 to 10 when the fuel is gasoline and, preferably, 5 to 6.5 at which the hydrogen content of a reformed gaseous mixture to be obtained is maximum. The imperfectly burnt gas mixture is then introduced through the opening 192 into the circumferentially continuous space or passage 218 in the reactor vessel 200 and then into the annular passage 214. The partial oxidization of the fuel by the imperfect combustion of the air-fuel mixture stably continues by the time the mixture has moved through the annular passage 214. Then, the mixture flows through the apertures 211 in the outer cylindrical wall 210 into the catalyst chamber 220 in which the catalyst bed 222 has already been heated to and kept at a temperature ranging from about 600° to 900° C (in certain cases, to higher than 1,000° C) partly by the imperfect combustion of the air-fuel mixture entering the catalyst chamber 220 and partly by the heat produced by a catalytic reaction which is induced on the surfaces of the catalyst particles of the catalyst bed 222 between small amounts of non-reacted parts of oxygen and the fuel. Thus, the catalyst carried by the catalyst particles of the catalyst bed 222 has been activated, so that the imperfectly burnt air-fuel mixture entering the catalyst chamber 220 is completely converted into a reformed gaseous mixture containing a large percentage (about 5% by weight) of hydrogen during the passage of the air-fuel mixture through catalyst bed 222 and in contact with the catalyst particles thereof. The reformed gaseous mixture thus obtained flows through the delivery pipe 226 into the mixing chamber 38 and is mixed with air from the air filter 32. The flap valve 228 and the throttle valve 34 are operable to control the flow of the reformed gaseous mixture through the delivery pipe 226 into the mixing chamber 38 and the flow of the air to the mixing chamber 38, respectively, so that the reformed gaseous mixture and the air are mixed in the mixing chamber 38 at a proper mixing ratio to form a diluted reformed gaseous mixture to be introduced into the combustion chamber 18 in the engine 10. The diluted reformed gaseous mixture is easily combustible in the engine combustion chamber 18 even at a very lean air-fuel ratio because of the presence of hydrogen in the diluted reformed gaseous mixture. Thus, the system of the present invention is effective to reduce three harmful components, hydrocarbon (HC), carbon monoxide (CO) and nitrogen oxides ($NO_x$), of the engine exhaust gases.

Figure 3:
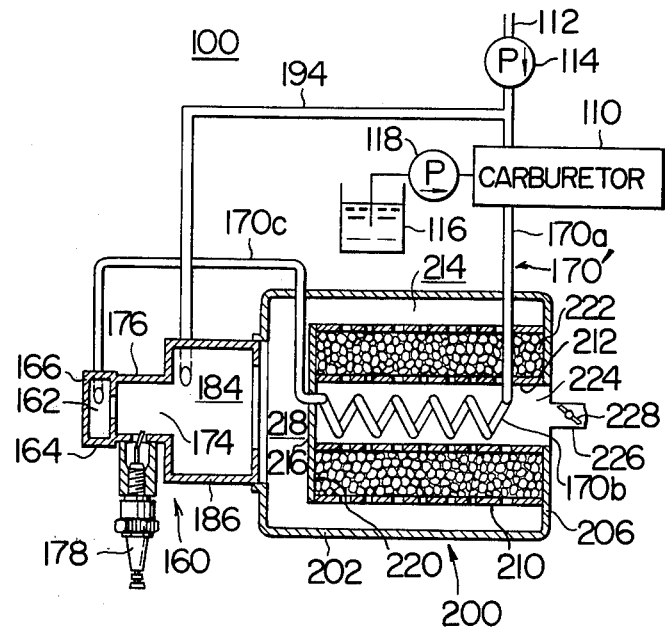
FIG. 3 is a view similar to FIG. 1 illustrates a modification of the fuel reforming system shown in FIG. 1.

FIG. 3 illustrates a modification of the fuel reforming system shown in FIG. 1. The modification is characterized by a feature that the rich air-fuel mixture produced by the carburetor 110 is first pre-heated by the reformed gaseous mixture produced by the fuel reforming system 100 and then fed into the pre-swirling chamber 162. More specifically, the rich mixture supply pipe 170 of the embodiment 100 shown in FIG. 1 is replaced by a rich mixture supply pipe 170' which includes a first part 170a connected to the carburetor 110 and extending radially inwardly through the peripheral wall 202 of the reactor vessel 200, the annular passage 214, the outer cylindrical wall 210, the catalyst bed 222 and the inner cylindrical wall 212 into the central passage 224. The first part 170a is connected to one end of a second part 170b in the form of a spiral coil of tube disposed in the central passage 224 and extending axially thereof. The first part 170a is so positioned with respect to the reactor vessel 200 that said end of the spiral coil of tube 170b is located adjacent to the downstream end of the central passage 224 in the vessel 200. The other end of the spiral coil of tube 170b is located near to the upstream end of the central passage 224 and connected to a third part 170c of the rich mixture supply pipe 170'. The third part 170c extends axially through the disc-like closure plate 216, radially outwardly through the circumferentially continuous passage 218 and the peripheral wall 202 of the reactor vessel 200 and is connected to the peripheral wall 164 of the pre-swirling chamber 162 as in the embodiment shown in FIG. 1.

The rich air-fuel mixture produced by the carburetor 110 is heated by the heat produced in the reactor vessel 200, so that the fuel contained in the rich air-fuel mixture is effectively atomized before the rich air-fuel mixture is introduced into the burner 160. This improves the ignitability of the air-fuel mixture in the burner 160 with a resultant advantage that the partial oxidation of a part of the fuel due to imperfect combustion of the remainder of the fuel is more stably induced. In addition, because the spiral coil of tube 170b is disposed in the central passage 224, the spiral coil of tube 170b does not require any extra space and the entire system can be very compact.

The burner 160, the reactor vessel 200 and the third part 170c of the rich mixture supply pipe 170' may be covered with layers of a heat insulating material to keep the interiors of them at elevated temperatures so that the rate and efficiency of the thermal decomposition reaction in the fuel reforming system can be improved.

Figure 4:
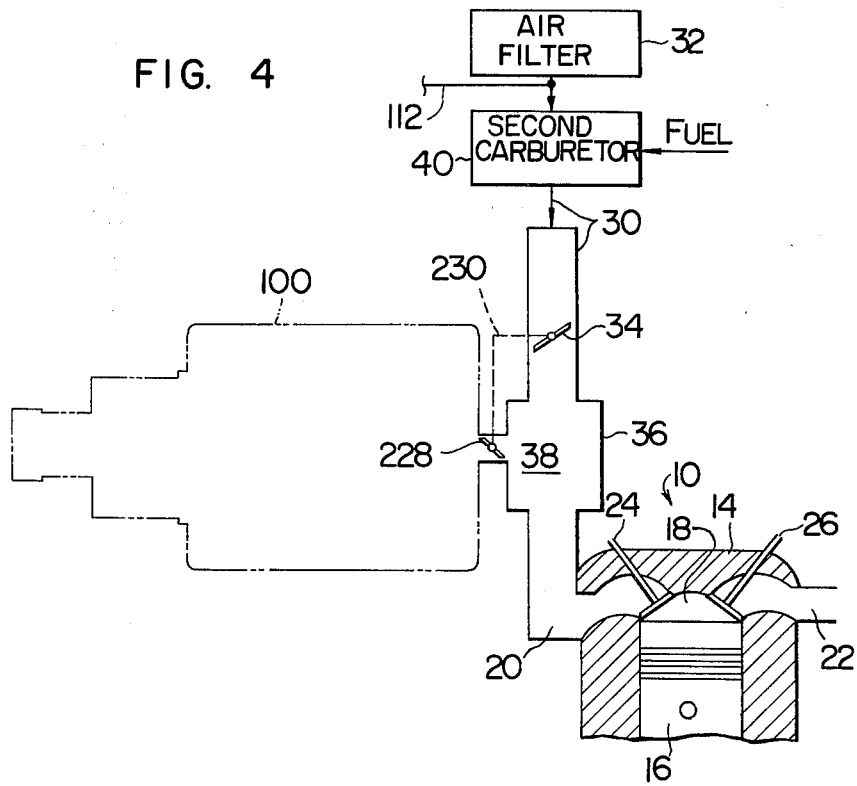
FIG. 4 is a diagrammatic illustration of an internal combustion engine associated with the fuel reforming system of the present invention and having an intake system modified from that shown in FIG. 1.

The delivery pipe 226 may be provided with a cooler for cooling the reformed gaseous mixture to a temperature appropriate for the introduction of the reformed gaseous mixture into the engine 10. The delivery pipe 226 may also be provided with a filter for removing any foreign particles, such as soot, from the reformed gaseous mixture. The flap valve 228 has been described and illustrated as being operatively connected to the engine throttle valve 34 but may alternatively be controlled by signals which represent engine operation parameters such as the engine speed, load on the engine and the composition of the engine exhaust gases. Moreover, a second carburetor 40 may be installed in the intake pipe 30 between the air filter 32 and the throttle valve 34, as shown in FIG. 4, to produce a lean mixture of air and a fuel so that the lean air-fuel mixture is mixed in the mixing chamber 38 with the reformed gaseous mixture from the fuel reforming system 100 according to the present invention. The intake system shown in FIG. 4 is advantageous in that the emission of the harmful components of engine exhaust gases is reduced by the operation of the engine with a lean air-fuel mixture and, at the same time, the efficiency of charge to the engine is improved with resultant advantageous increase in the engine output.

The engine 10 associated with the fuel reforming system 100 according to the present invention has been described and illustrated as being of conventional or ordinary type. However, the engine 10 may be of a stratified charge engine having a combustion chamber comprising a main combustion chamber and an auxiliary or sub-combustion chamber. In the case where the fuel reforming system of the present invention is associated with the second type of engine, the reformed gaseous mixture produced by the system of the invention may be fed into the auxiliary or sub-combustion chamber, while the main combustion chamber may be supplied with air alone or a lean air-fuel mixture, so that the reduction in the emission of harmful exhaust gas components, which reduction per se is a characteristic of the stratified charge engine, can be further facilitated.

What is claimed is:

1. A fuel reforming system for converting a rich mixture of air and a fuel into a reformed gaseous mixture containing hydrogen and for feeding the reformed gaseous mixture into a combustion chamber of an internal combustion engine, said system comprising:

means for producing the rich mixture of air and the fuel;

a burner of vortex combustion type for imperfectly burning the rich air-fuel mixture to cause partial oxidation of the fuel contained in the rich air-fuel mixture thereby to produce a partially oxidized gaseous mixture;

said burner including an ignition chamber disposed downstream of said rich mixture producing means so that the rich air-fuel mixture is introduced into said ignition chamber to form a vortex of the rich air-fuel mixture therein, said ignition chamber being provided with an igniting means for igniting the rich air-fuel mixture received from said rich mixture producing means, said burner further including an imperfect combustion chamber disposed in communication with said ignition chamber for receiving the thus ignited rich air-fuel mixture from said ignition chamber to cause the partial oxidization of the fuel and thus produce the partially oxidized gaseous mixture;

a reactor vessel provided with an inlet through which the interior of said vessel is communicated with said imperfect combustion chamber of said burner, said reactor vessel being also provided with an outlet leading to said combustion chamber of said engine;

generally tubular means defining therein a central passage and a generally tubular chamber surrounding said central passage and being in fluid flow communication therewith, said tubular means being disposed in said reactor vessel so that said tubular means and said reactor vessel cooperate to define therebetween a second passage surrounding said tubular chamber and being in fluid flow communication with said imperfect combustion chamber and with said tubular chamber and so that said central passage is connected to said reactor vessel, whereby said partially oxidized gaseous mixture can flow through said second passage into said tubular chamber; and catalyst means disposed in said tubular chamber for facilitating catalytic conversion of said partially oxidized gaseous mixture to the reformed gaseous mixture, the reformed gaseous mixture thus produced flowing out of said tubular chamber into said central passage and then through said outlet of said reactor vessel toward said combustion chamber of said engine.

2. A fuel reforming system as defined in claim 1, further including heat exchanger means for placing the rich air-fuel mixture in heat exchange relationship with the reformed gaseous mixture before the rich air-fuel mixture is introduced into said burner, whereby the rich air-fuel mixture is heated by the reformed gaseous mixture to improve the atomization of the fuel contained in the rich air-fuel mixture.

3. A fuel reforming system as defined in claim 2, wherein said heat exchanger means comprises a spiral coil of tube disposed in said central passage in said reactor vessel and interconnecting said rich mixture producing means and said burner.

4. A fuel reforming system as defined in claim 1, wherein said fuel is gasoline and wherein said rich mixture producing means is operative to produce the rich air-fuel mixture of an air-fuel ratio ranging from 3 to 9.

5. A fuel reforming system as defined in claim 1, further including means for feeding additional air into said imperfect combustion chamber so that the additional air swirls therein.

6. A fuel reforming system as defined in claim 5, wherein said fuel is gasoline and wherein the additional air is supplied to said imperfect combustion chamber at such a rate that the total of the rich air-fuel mixture produced by said rich mixture producing means and the additional air is of an air-fuel ratio ranging from 5.0 to 6.5.

7. A fuel reforming system as defined in claim 1, further including a valve means disposed downstream of said central passage in said reactor vessel for controlling the flow of the reformed gaseous mixture through said outlet of said reactor vessel.

8. A fuel reforming system as defined in claim 1, wherein said generally tubular means comprise a pair of generally tubular and substantially concentric perforated walls defining said tubular chamber therebetween, and wherein said catalyst means comprise a catalyst bed formed from catalyst particles.

9. A fuel reforming system for converting a rich mixture of air and a fuel into the reformed gaseous mixture containing hydrogen and for feeding the reformed gaseous mixture into a combustion chamber of an internal combustion engine, said system comprising:

means for producing the rich mixture of air and the fuel;

a burner of vortex combustion type for imperfectly burning the rich air-fuel mixture to cause partial oxidization of the fuel contained in the rich air-fuel mixture thereby to produce a partially oxidized gaseous mixture;

said burner including a pre-swirling chamber connected to said rich mixture producing means so that the rich air-fuel mixture is introduced into said pre-swirling chamber to form a vortex of the rich air-fuel mixture therein, an ignition chamber disposed in communication with said pre-swirling chamber and provided with an igniting means for igniting the rich air-fuel mixture received from said pre-swirling chamber, and an imperfect combustion chamber disposed in communication with said ignition chamber for receiving the thus ignited rich air-fuel mixture from said ignition chamber to cause the partial oxidization of the fuel and thus produce the partially oxidized gaseous mixture;

a reactor vessel provided with an inlet through which the interior of said vessel is communicated with said imperfect combustion chamber of said burner, said reactor vessel being also provided with an outlet leading to said combustion chamber of said engine;

generally tubular means defining therein a central passage and a generally tubular chamber surrounding said central passage and being in fluid flow communication therewith, said tubular means being disposed in said reactor vessel so that said tubular means and said reactor vessel cooperate to define therebetween a second passage surrounding said tubular chamber and being in fluid flow communication with said imperfect combustion chamber and with said tubular chamber and so that said central passage is connected to said outlet of said reactor vessel, whereby said partially oxidized gaseous mixture can flow through said second passage into said tubular chamber; and catalyst means disposed in said tubular chamber for facilitating catalytic conversion of said partially oxidized gaseous mixture to the reformed gaseous mixture, the reformed gaseous mixture thus produced flowing out of said tubular chamber into said central passage and then through said outlet of said reactor vessel toward said combustion chamber of said engine.

10. A fuel reforming system as defined in claim 9, further including means for feeding additional air into said imperfect combustion chamber so that the additional air swirls therein.

11. A fuel reforming system for converting a rich mixture of air and a fuel into a reformed gaseous mixture containing hydrogen, said system being adapted for use with an internal combustion engine of the type comprising a combustion chamber, a carburetor for producing a lean mixture of air and gasoline, an intake pipe for introducing the lean air-gasoline mixture into said combustion chamber, and a throttle valve disposed in said intake pipe for controlling the flow of the lean air-gasoline mixture through said intake pipe, said fuel reforming system comprising:

means for producing the rich mixture of air and the fuel;

a burner of vortex combustion type for imperfectly burning the rich air-fuel mixture to cause partial oxidization of the fuel contained in the rich air-fuel mixture thereby to produce a partially oxidized gaseous mixture;

said burner including a pre-swirling chamber connected to said rich mixture producing means so that the rich air-fuel mixture is introduced into said pre-swirling chamber to form a vortex of the rich air-fuel mixture therein, an ignition chamber disposed in communication with said pre-swirling chamber and provided with an igniting means for igniting the rich air-fuel mixture received from said pre-swirling chamber, and an imperfect combustion chamber disposed in communication with said ignition chamber for receiving the thus ignited rich air-fuel mixture from said ignition chamber to cause the partial oxidization of the fuel and thus produce the partially oxidized gaseous mixture;

a reactor vessel provided with an inlet through which the interior of said vessel is communicated with said imperfect combustion chamber of said burner, said reactor vessel being also provided with an outlet connected to said intake pipe of said engine;

generally tubular means defining therein a central passage and a generally tubular chamber surrounding said central passage and being in fluid flow communication therewith, said tubular means being disposed in said reactor vessel so that said tubular means and said reactor vessel cooperate to define therebetween a second passage surrounding said tubular chamber and being in fluid flow communication with said imperfect combustion chamber and with said tubular chamber and so that said central passage is connected to said outlet of said reactor vessel, whereby said partially oxidized gaseous mixture can flow through said second passage into said tubular chamber;

catalyst means disposed in said tubular chamber for facilitating catalytic conversion of said partially oxidized gaseous mixture to the reformed gaseous mixture, the reformed gaseous mixture thus produced flowing out of said tubular chamber into said central passage and then through said outlet of said reactor vessel into said intake pipe of said engine; and a valve means disposed between said reactor vessel and said intake pipe of said engine and operatively connected to said throttle valve to control the flow of the reformed gaseous mixture from said reactor vessel into said intake pipe.

* * * * *